(12) United States Patent
Mayo

(10) Patent No.: US 11,081,089 B2
(45) Date of Patent: Aug. 3, 2021

(54) FLICKER-FUSION-BASED IMAGE CAPTURE PRIVACY CONTROL SYSTEM

(71) Applicant: Todd Mayo, Columbia, MD (US)

(72) Inventor: Todd Mayo, Columbia, MD (US)

( * ) Notice: Subject to any disclaimer, the term of this patent is extended or adjusted under 35 U.S.C. 154(b) by 514 days.

(21) Appl. No.: 15/890,294

(22) Filed: Feb. 6, 2018

(65) Prior Publication Data

US 2018/0226060 A1 Aug. 9, 2018

Related U.S. Application Data

(60) Provisional application No. 62/455,317, filed on Feb. 6, 2017.

(51) Int. Cl.

| | | |
|---|---|---|
| *G02B 26/00* | (2006.01) | |
| *G02F 1/03* | (2006.01) | |
| *G02B 27/10* | (2006.01) | |
| *G09G 5/36* | (2006.01) | |
| *G06F 21/60* | (2013.01) | |
| *G09G 5/02* | (2006.01) | |
| *G09G 5/10* | (2006.01) | |
| *G09G 5/00* | (2006.01) | |
| *G06F 21/84* | (2013.01) | |
| *G06F 3/147* | (2006.01) | |

(52) U.S. Cl.
CPC ............ *G09G 5/363* (2013.01); *G06F 3/147* (2013.01); *G06F 21/60* (2013.01); *G06F 21/84* (2013.01); *G09G 5/003* (2013.01); *G09G 5/026* (2013.01); *G09G 5/10* (2013.01)

(58) Field of Classification Search
CPC .............. G02B 26/001; G02B 26/0841; G02B 27/145; G02B 27/144; G02B 27/1013; H04N 9/3197
USPC ........ 359/237–238, 242, 290–292, 298, 618, 359/629, 639
See application file for complete search history.

(56) References Cited

U.S. PATENT DOCUMENTS

| | | | | |
|---|---|---|---|---|
| 7,634,134 B1 * | 12/2009 | So | ......................... | G06T 1/0085 380/201 |
| 2009/0144674 A1 * | 6/2009 | Koithyar | ............. | G06F 30/3312 716/136 |

* cited by examiner

*Primary Examiner* — Dawayne Pinkney
(74) *Attorney, Agent, or Firm* — Michael L. Greenberg, Esq.; Greenberg & Lieberman, LLC

(57) ABSTRACT

A method and system of software, firmware, and conditionally-transparent media to provide recorded visual image privacy through the use of flicker fusion-based obscuration. Such conditionally-transparent media possess the capability to display programmable image and pattern-based opacity gradations and adjustments which are invisible to the human eye and yet disrupt clear image capture with visual recording devices. Use of this invention will limit the gathering and generation of visually-discernable image content using visible light transparent materials, for the purpose of limiting the successful recording of imagery that a user wishes to obscure for the purposes of privacy.

15 Claims, 2 Drawing Sheets

FLICKER-FUSION-BASED IMAGE CAPTURE PRIVACY CONTROL SYSTEM

CONTINUITY

This application is a non-provisional patent application of provisional patent application No. 62/455,317, filed on Feb. 6, 2017, and priority is claimed thereto.

FIELD OF THE PRESENT INVENTION

The present invention relates to media display and reproduction, and more specifically relates to the obscuration or obfuscation of media to non-biological image receptors such as artificial eyes, cameras, and other digital recording devices.

BACKGROUND OF THE PRESENT INVENTION

In the modern digital age, the notion of privacy appears to be fleeting. With nearly every individual in a developed region of the world having at least one camera on their person at any given time, the prospect of secrecy and privacy in public remains elusive. The ever-increasing prominence of security and CCD cameras distributed heavily throughout most towns and cities exacerbates this lack of privacy in public. Celebrities recognize this fact quite readily, as even a quick car ride to the grocery store is often recorded by numerous individuals with both professional and amateur recording equipment. Tinted windows offer limited protection from the prying eyes and recording equipment of strangers, but they also limit the experience of the ride by limiting the passengers' visibility. If there were a way to maintain the clarity of a window, such as those in a vehicle or home, without the need for tinting to achieve privacy and protection from image capture devices, individuals could maintain their privacy while enjoying the view from a clear, non-tinted window.

Additionally, due in part to the prominence of digital image capture devices, content displayed on digital displays such as computer screens, smartphone screens, tablet screens, televisions, etc. are subject to theft from users employing digital image capture devices to photograph the contents displayed on the digital display. Therefore, intellectual property, banking and finance information, and even personal data is often subject to theft via a digital image capture device such as digital cameras and camcorders. Little is presently marketed to combat this form of direct within the 'line-of-sight' theft.

Some computing devices are equipped with digital display screens that are purposely made with narrow viewing angles in order to minimize the range in which others can view the contents of the digital display. However, this technology does little to combat the recording of an image with a digital image capture device oriented within the viewable angles afforded by the display. Additionally, those wishing to view the contents of the digital display, and desiring to capture the contents with a digital (or analog) image capture device may simply move to a more appropriate angle in order to capture the image or video. If there were a way to obscure or blur-out any photograph or video taken of the digital display from any angle, the privacy of the individual could be more easily maintained.

Thus, there is a need for a new method of image obscuration system capable of functioning on all types of windows, as well as on all types of digital video displays, including but not limited to CRT, LED, OLED, Plasma, LCD, LED projection, translucent OLED, as well as other still or moving image displays presently in development. Such a system would not be limited by resolution, material, dimensionality nor screen size, and preferably employs a transparent layer embedded within, or expanded across, a display screen, window, panel, sheet, or other dividing or covering surface to facilitate a flicker-fusion based effect of image obfuscation. Such a system is preferably configured to render any digitally captured recording or image capture through the obscuring layer as incomplete.

SUMMARY OF THE PRESENT INVENTION

The present invention consists of a system and method of preventing the capture of visually recorded imagery by disrupting the consistency and completeness with which light reflections from a subject reach a recording device. The disruptions, or obscuring patterns, are generated on or within the transparent display media (i.e. windows, eyewear, contact lenses, glass panels, screens, sheets, coatings, mists, walls, etc.) that will exist between the subject and a recording device. As such, it is envisioned that the present invention is suited for use on a wide variety of conventional household and vehicle windows, as well as digital display devices, including, but not limited to: smartphone displays, tablet computer displays, laptop displays, PDA displays, smartwatch displays, and other graphic display technologies. The system employs software configured to alter the manner by which media is presented and therefore perceived by recording devices. In short, the present invention facilitates the obfuscation of media (with opaque sections produced via a microprocessor and power source) to recording devices so as to meaningfully prevent effective recording of the content by a recording/image capture device.

The methods and tools with which the present invention comprises will prevent a visual recording device from capturing definitive recognizable images through a transparent medium. For example:

An unauthorized picture taken of a celebrity through a car window outfitted with the system of the present invention would yield only a blurred, incomplete, or jumbled image with no useful identifying content.

An unauthorized photograph taken of an automobile license plate through a license plate cover outfitted with the system of the present invention would yield no identifiable pattern of alphanumeric characters.

An unauthorized video of an individual wearing eyewear fitted with the system of the present invention would render limited identifiable facial image content.

An unauthorized video captured through an apartment window outfitted with the system of the present invention would render limited image content of persons or property inside.

An unauthorized video captured through a laptop/tablet/smartphone camera lens cover outfitted with this invented technology would render limited image content of persons or property in situations where the device has been hacked to surreptitiously capture and transmit images.

The essence of this invention is centered on providing an individual with privacy-oriented anonymity with respect to visually recorded content, while still allowing an individual and his property to be plainly visible to the naked eye.

The present invention preferably employs a microprocessor (SOC or other IC) to generate and randomize the obscured segments distributed across the transparent layer.

The transparent layer is preferably embedded within the digital display or window, overlaid on top of the digital display or window, or disposed behind the digital display or window. By generating randomized translucent or opaque sections/segments/partitions distributed across an otherwise clear media at sufficiently high Hz frequencies (conventionally 30 Hz and above), the media (or subject/items behind the glass window) will appear completely clearly visible to the naked eye of humans, due to the flicker fusion effect, but obscured/blurred/disrupted to recording devices. Just as one is able to clearly see objects through a moving fan blade; however, if a photograph or series of photographs (video) is taken of a subject behind the moving fan, the result of the recorded image capture of the subject behind the fan would show an image partially obscured by the blades. This is also similar to how an individual does not see the black lines that exist between each frame of a film while it is shown in a theatre.

The system and method of the present invention capitalizes on this effect via the implementation and installation of a transparent layer disposed on or within the digital display or window, powered via an adjacent power source in communication with a microprocessor. The microprocessor preferably generates and regulates the frequency by which the opaque sections rotate/oscillate/alternate/vary/randomize.

BRIEF DESCRIPTION OF THE DRAWINGS

The present invention will be better understood with reference to the appended drawing sheets, wherein.

DETAILED DESCRIPTION OF THE PREFERRED EMBODIMENT

Figure 1:
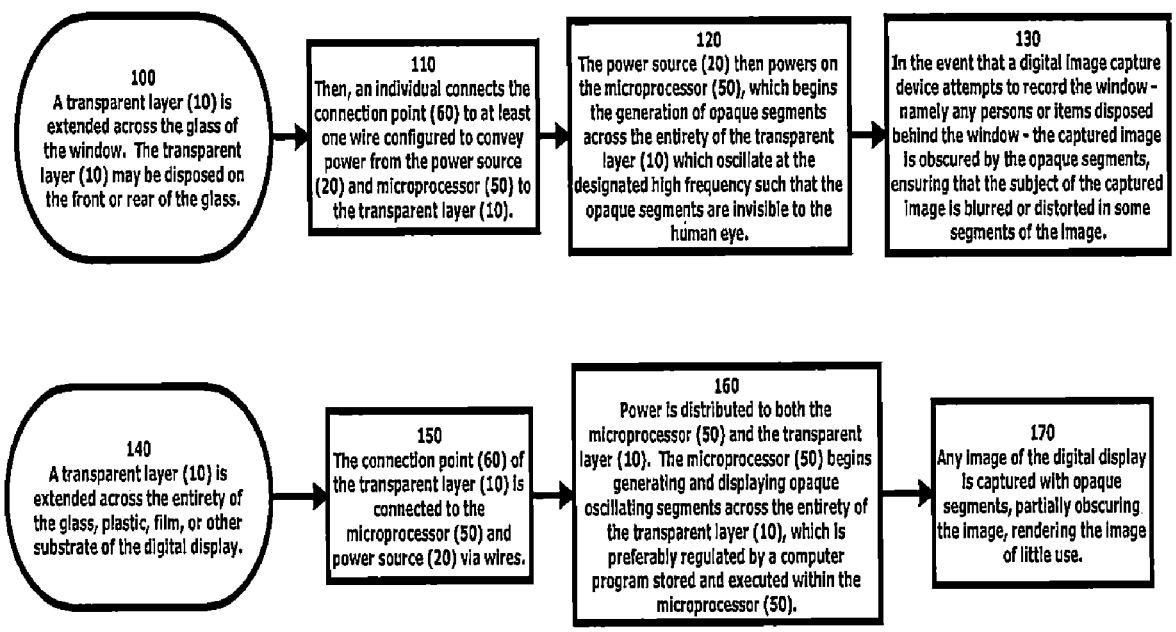
FIG. 1 displays a flow chart of the method of use of the system of the preferred embodiment of the present invention.
Figure 3:
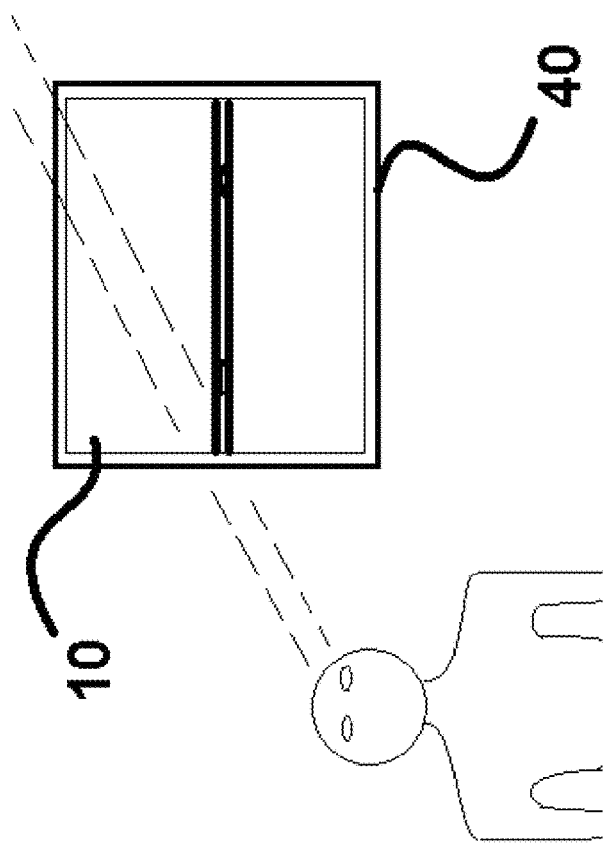
FIG. 3 exhibits an embodiment of the system of the present invention as installed and integrated within a window panel, showing a human viewing the area behind the window panel.
Figure 2:
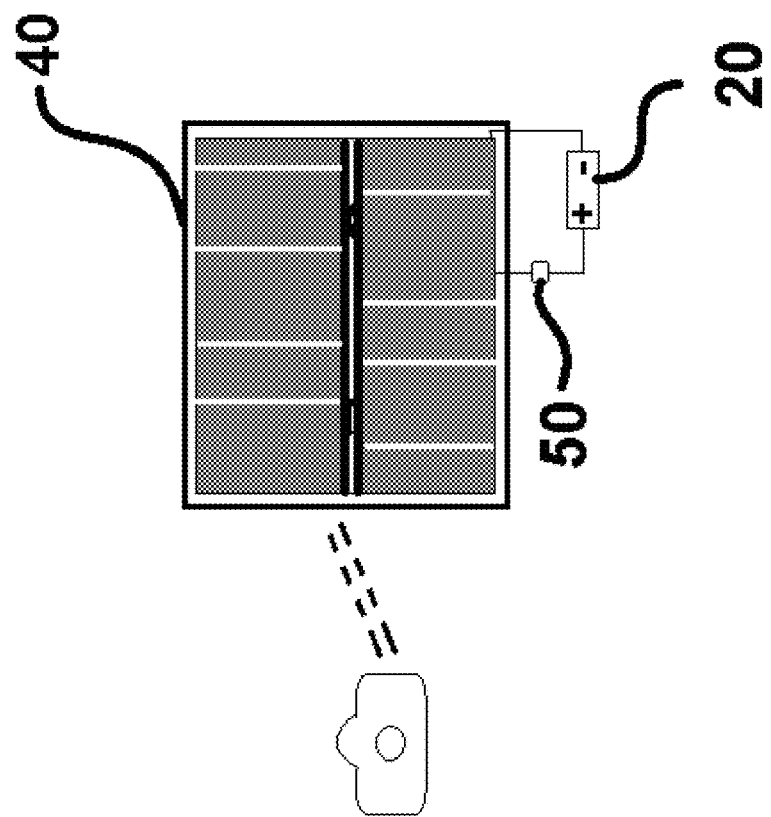
FIG. 2 displays an embodiment of the system of the present invention as installed on, and integrated within, a window panel, showing a camera unable to view an image disposed behind the window.

The present invention is a system and method of obfuscation via the use of a flicker-fusion effect present across a transparent layer (10) present across or within the glass of a digital display or a window (40). The transparent layer (10) of the present invention is in communication with a power source (20), which is preferably integrated with the power source of the digital display in embodiments in which the present invention is integrated or present on a conventional digital image display device. Other embodiments of the present invention are envisioned for use on any transparent or semi-transparent material, compound, surface, liquid, gas, or solid (40), including those fashioned of glass, plexi-glass, transparent plastic, or other transparent substrate primarily employed by individuals through which the eye may view objects, people, environments, and the like. For example, the system and method of the present invention may be integrated to eyeglasses or sunglasses. Such an installation effectively obscures a portion of the wearer's face, restricting the sufficient amount of image detail captured to facilitate the effective use of facial recognition software. In such instantiations of the present invention, the power source and processing could be external and are dedicated to the creation of the flicker-fusion effect across some or all of the transparent layer (10) according to a fixed or dynamic frequency.

The system of the present invention functions by generating programmatically randomized translucent or opaque sections, segments, or partitions to otherwise transparent media at sufficiently high Hz frequencies (usually 30 Hz and above) across the transparent layer (10). As such, the transparent layer (10) is configured to only be partially photographically transparent when power is routed to the transparent layer (10) from the power source (20).

A microprocessor (50) disposed within the digital display, or adjacent to the transparent medium, is preferably configured to control the frequency (and pattern) of the flicker-fusion effect, which may be dynamically adjusted at random in an effort to prevent predictive recording (and image reconstruction) algorithms from circumventing the obscuration of the image subject.

On digital display devices and windows equipped with the system of the present invention, portions of the subject will remain visible to recording devices at all times, but never will the entire subject be viewable at one time by a recording device. For example, one disruption pattern could consist of logically dividing the clear display media into an 8 piece (or more) pie design. By generating translucent or opaque content within the media into selected 'slices' and at selected intervals, there will never be a completely unobstructed view to the image subject behind the transparent layer (10) at any given time. Therefore, any photo taken of a window or digital display equipped with the present invention will only capture a partial image of the intended subject. Video will capture multiple partial images in sequence; however the randomization of the 'slice' configuration will prevent the capture of sharp, easily recognizable images. Because a completely unobstructed view of the subject through the media is never present, the frames-per-second (fps) shutter speed settings of visual recording equipment are immaterial. As such, the system of the present invention is configured to function equally well against video recording devices employing a high shutter speed.

Additionally, the translucent or opaque sections provided via the transparent layer (10) can themselves contain random recognizable counter-imagery which, when contrasted with the partial images that are viewable through the media, would create further disruption of the quality of the image recorded. For example the opaque segments that are generated to hide a subject's face could themselves consist of an alternative image of some other face, further confusing attempts to accurately document the subject's identity. The complexity of the randomization of the obscuring patterns distributed across the transparent layer (10) would only be limited by the capabilities of the equipment and materials used, including the design and capabilities of the microprocessor and image generation software (50). The transparent layer (10) is preferably equipped with a connection point (60), which facilitates the connection between the transparent medium (10) to the power source (20) and microprocessor (50). It should be understood that some embodiments of the present invention may employ a photovoltaic component such that the power source (20) of the present invention may be interlaid on or in a portion of the transparent layer (10). Such embodiments are ideal for most windows disposed in remote locations, or those without any access to conventional power.

The system of the present invention is envisioned to be available as both an after-market installation to windows and digital displays, as well as an integrated component of new windows and digital displays pre-installed during manufacturing. The essence of implementation preferably does not vary greatly between after-market and preinstalled instantiations of the present invention.

The method of implementation of the system of the present invention for after-market use is preferably as follows:

For installation to windows, eye glasses, sunglasses, or similar conventional glass, the process is preferably as follows:

A transparent layer (10) is extended across the glass of the window. The transparent layer (10) may be disposed on the front or rear of the glass. The transparent layer (10) may be affixed with an adhesive lining edges of the transparent layer (10). (100) Then, an individual connects the connection point (60) to at least one wire (or other connection means) configured to convey power from the power source (20) and microprocessor (50) to the transparent layer (10).

(110) The individual also connects the image transmission connection. (115) The power source (20) then powers on the microprocessor (50), which begins the generation of opaque segments across some or all of the transparent layer (10) which oscillate at the designated high frequencies such that the opaque segments are invisible to the human eye. (120) In the event that a digital image capture device attempts to record a subject through the window—namely any persons or items disposed behind the window—the captured image is obscured by the opaque segments, ensuring that the subject of the captured image is blurred or distorted in some segments of the image. (130) It is envisioned that many windows and other forms of glass may be pre-installed with the system of the present invention during manufacturing. In such cases, the transparent layer (10) may be embedded within the glass, or disposed between two panes of double-pane glass.

It should be understood that the image transmission connection, as well as the power connection may be facilitated through a fiber optic or wireless means, or in some cases, the microprocessor (50) and the power source (20) may be contained within the transparent layer (10) itself.

It is envisioned that many digital displays will be equipped with the system of the present invention during manufacturing. However, for aftermarket installation of the present invention to digital displays, such as those on mobile devices, televisions, and computer displays, the process is preferably as follows:

A transparent layer (10) is extended across some or all of the glass, plastic, film, or other substrate of the digital display. (140) The connection point (60) of the transparent layer (10) is connected to the microprocessor (50) and power source (20) via wires (or other connection means). (150) Power is distributed to both the microprocessor (50) and the transparent layer (10). The microprocessor (50) begins generating and displaying opaque oscillating segments across some or all of the transparent layer (10), which is preferably regulated by a computer program stored and executed within the microprocessor (50). (160) Any image of the digital display is captured with opaque segments, partially obscuring the image, rendering the image of little use. (170)

In short, it should be understood that the present invention is a system configured to implement, utilize, and sustain flicker fusion effects and transparent display media to obscure and limit the capture of visually recorded content. As such, it is envisioned that the system of the present invention may be configured to extend to other, non-visible to the naked eye, ranges of electromagnetic radiation that could conceivably be used for image capture, including infrared and ultraviolet wavelengths of the spectrum. The application of the system of the present invention to these alternate, non-visible ranges would depend on the existence of display media with properties that would allow for the control of the degree to which such radiation could pass or emanate.

Similarly, it should be understood that alternate embodiments of the present invention may be configured for use with some virtual invisibility concepts, such as those in which a camera is placed directly behind a subject and the images that are captured are then projected on some display medium directly in front of the subject. Because a viewer of the display would only see the images of what is behind the subject, the subject becomes, to some degree, invisible. As such, in these instances, the system of the present invention could be incorporated such that a subject would be visible to the naked eye, and yet somewhat invisible or "ghost-like" to visual recording equipment.

It should be understood that the present invention is envisioned to also be implemented through the external projection of obscuration-producing lighting, images, objects, or particles onto, or in front of surfaces and objects, and into spaces to generate refraction- and reflection-based flicker fusion effects for subjects that lack built-in image-generation capabilities. The projections could emanate from a range of positions and distances from the target surface or space and would produce lighting, color, pattern, and opacity contrasts that would generate image-obscuring properties.

It should be understood that the present invention is envisioned for use not only on current standard image and video display device hardware technologies, but also on any future video display device technologies likely to be developed. This includes technologies configured for wide usage and mass production, but also those specifically designed for implementation, and integration with, the system of the present invention.

It is envisioned that the microprocessor (50) of the present invention is preferably a SOC (system on a chip) or similar integrated circuit (IC) capable of executing basic programs. In instances of implementation of the system of the present invention to a digital display functioning in concert with a computer, such as a PC or laptop, the duties of the microprocessor (50) may be handled by onboard systems. Similarly, the power source (20) of the present invention may be shared from the conventional power source of the computer or mobile device.

Additionally, it should be understood that the system and method of the present invention includes the implementation of the flicker fusing image obscuration effect with any surface, material, photonic, or environmental media display technology possessing manipulated image display capabilities. Namely, the transparent layer (10) can be fashioned for use on practically any surface or space to facilitate the flicker fusion obscuration effect. This includes newly developed technologies, or those presently in various stages of development, including, but not limited to displays with:

both rigid and flexible clear image display media;

liquid, powdercoated and other surface coating and coverage media;

biologically-based cell- or tissue-based media with image display capabilities.

Examples would include chromatophores used by octopus and other cephalopods;

nanotechnology used to create a medium which images can be generated and manipulated;

2-dimensional and 3-dimensional technologies; Examples would include multi-layered display surfaces that would be used to generate layered image content, as well as prismatic technologies;

gaseous, aerosolized, and liquid media; Examples would include image projection on veils of mist used by Disney™ and other companies;

laser technologies;

holography technologies;

florescence technologies;

high-frequency vibrational technologies, both sound wave- and direct physical movement-generated;

artificial intelligence driven technologies;

various electromagnetic frequencies ranges that might be used to generate imagery-visible light, ultraviolet, infrared, etc.

the full range of display transparencies, from 100% down to virtually opaque;

Examples would include tinted or frosted glass; and combinations of different display media.

Similarly, the scope of the present invention includes implementation on any technology equipped with the capability to alter the visually recognizable recording capabilities of an item, surface, or space, including camouflage techniques, such as active or adaptive camouflage, to the extent that they would enable visual viewing (by a person), but prevent visual recording. Additionally, it is envisioned that the present invention may be implemented on any material of any rigidity/flexibility that has properties of inhibiting recording of visually recognizable imagery. As such, this includes not only flat surfaces and lenses, but also flexible and fabric-like materials, such as veils, sheets, cloaks, etc. This is in addition to any liquid and/or gaseous material as previously referenced. Likewise, it is envisioned that the present invention be useful on technology involving flexible and/or stretchable electronics.

Without additional limitation, it should be understood that the present invention is envisioned to apply to any produced and/or projected/transmitted patterns, shapes, degrees of transparency, duration of images, video segments, randomness of imagery, and flicker speed, etc. References to light reflection within this application should be understood to include all forms of reflection that could produce a recordable image. For example, there could soon exist situations in which there is a requirement for something or someone to be fully viewable in a spectrum range other than visible light for a legitimate purpose, just as the spectrum of visible light is currently in many settings. For example, with respect to infrared imaging, camouflage technology developed by BAE Systems™ enables the switching of sections of material from hot to cold in order to disguise the presence or inherent shape of things such as vehicles, structures, etc. Such technology may soon exist to allow otherwise transparent materials to use flicker fusion to obscure visible light as well as infrared light, ultraviolet light, etc. Additionally, it should be understood that the transparent layer (10) of the present invention is equipped with graphical pigment particles/pixels capable of displaying the opaque oscillating segments to infringe clear image capture. These graphical pigment particles/pixels should be understood to be created via image generation components.

With respect to the words 'video' and 'photography' as used within the present application, in their strictest sense they refer to visible light; however, usage of these words has come to mean any image from any source ultimately visually interpretable by the human eye.

Having illustrated the present invention, it should be understood that various adjustments and versions might be implemented without venturing away from the essence of the present invention. Further, it should be understood that the present invention is not solely limited to the invention as described in the embodiments above, but further comprises any and all embodiments within the scope of this application.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The exemplary embodiment was chosen and described in order to best explain the principles of the present invention and its practical application, to thereby enable others skilled in the art to best utilize the present invention and various embodiments with various modifications as are suited to the particular use contemplated.

I claim:

1. A method for inhibiting the capture of images/video by recording devices without infringing direct visibility of the images/video by a user comprising:

placing a transparent layer across at least one portion of a substrate display medium;

placing the transparent layer in communication with a microprocessor;

placing the microprocessor in communication with a power source;

the microprocessor generating and displaying opaque oscillating segments across at least one portion of the entirety of the transparent layer;

the opaque oscillating segments producing a flicker-fusion effect;

upon images/video view attempt by a user looking through the transparent layer, the opaque oscillating segments are invisible; and upon image/video capture attempt, the resulting capture is obscured by the opaque oscillating segments which are captured as present across the transparently layer.

2. The method of claim 1, wherein the opaque oscillating segments are invisible to human natural vision.

3. The method of claim 1, wherein the transparent layer is equipped with graphical pigment particles/pixels equipped with the capacity to create said opaque oscillating segments.

4. The method of claim 1, wherein the microprocessor is a system-on-a-chip (SOC/IC) equipped with a program stored in memory.

5. The method of claim 1, wherein the substrate display medium has visual transparency characteristics, with examples including:

eyewear, contact lenses, windows, display casings, shields, covers, electronic device screens, projection device lenses, wall panels, ceiling panels, floor panels, fabrics, meshes, netting, mists, films, and coatings.

6. The method of claim 1, wherein the microprocessor and the power source are contained within said transparent layer.

7. The method of claim 1, wherein the microprocessor and the power source are contained within image generation components required to create the obfuscation segments across at least one portion of the chosen medium.

8. The method of claim 1, wherein the power source is a power source selected from the following group: battery, capacitor, and AC power.

9. The method of claim 1, wherein the opaque segments infringe the image/video capture of infrared recording.

10. The method of claim 1, wherein the opaque segments infringe the image/video capture of ultraviolet recording.

11. A system for the prevention of clear/non-distorted image/video capture via a recording device comprising:
- a transparent layer;
- a power source;
- a microprocessor, said microprocessor is in communication with said power source;
- wherein said power source configured to distribute power to said microprocessor and said transparent layer;
- wherein said microprocessor generates opaque oscillating segments;
- wherein said microprocessor conveys said opaque oscillating segments to said transparent layer;
- wherein said transparent layer displays said opaque oscillating segments, creating a flicker fusion effect such that naked eye visibility is possible;
- wherein upon image/video capture attempt with the recording device, the resulting capture is obscured by the opaque oscillating segments which are captured as presented across the transparently layer;
- wherein said flicker fusion effect obscures visual recording.

12. The system of claim 11, further comprising:
the opaque oscillating segments infringing image/video capture in the ultraviolet spectrum.

13. The system of claim 11, further comprising:
the opaque oscillating segments infringing image/video capture in the infrared spectrum.

14. The system of claim 11, further comprising:
the opaque oscillating segments infringing image/video capture in the visible light spectrum.

15. The system of claim 11, wherein said opaque oscillating segments provide for obstructions of said transparent layer, preventing full visibility solely to the recording device; and
wherein said transparent layer is invisible.

* * * * *